Figure 1:
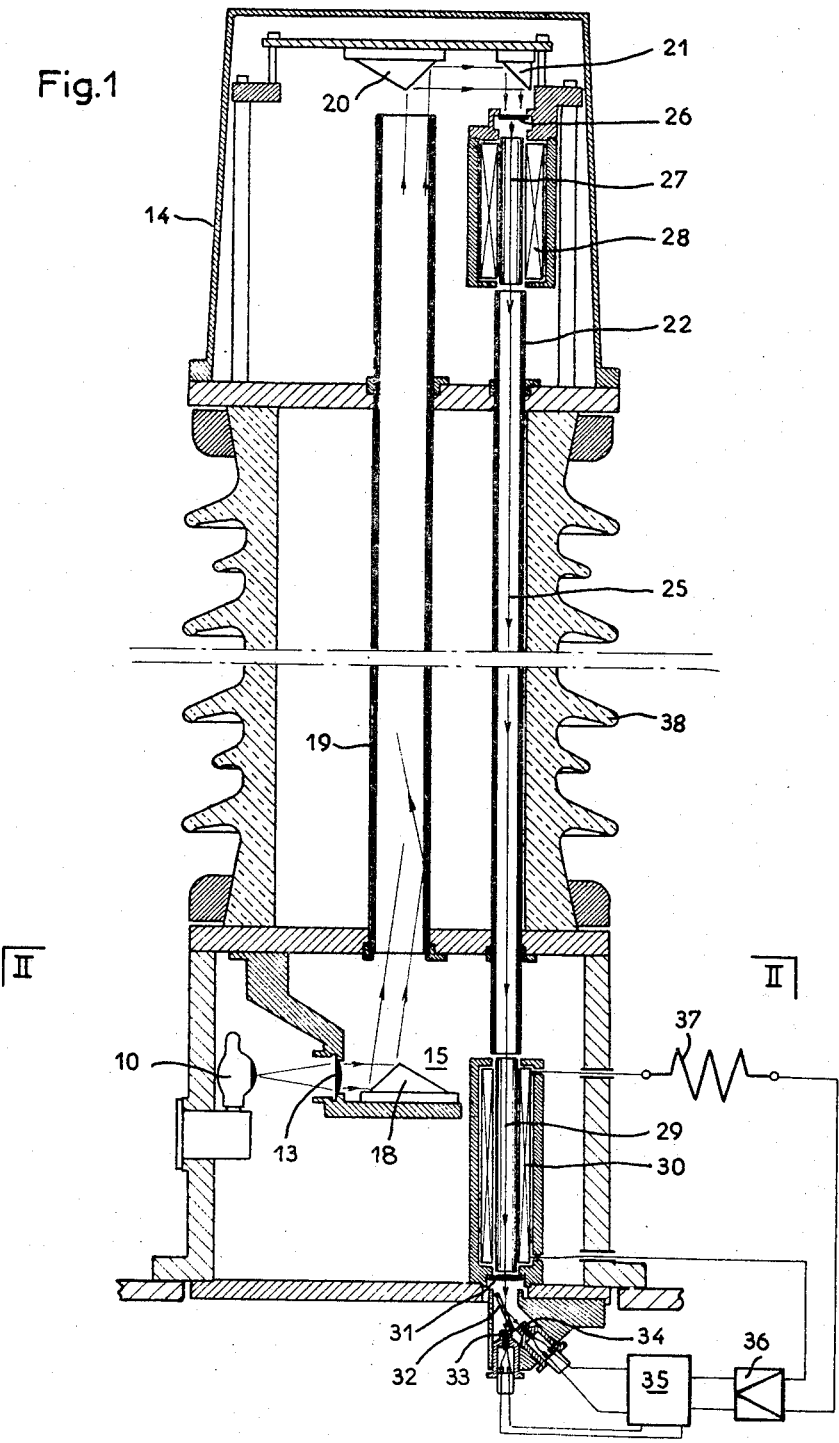

United States Patent Office 3,419,803
Patented Dec. 31, 1968

3,419,803
APPARATUS FOR CURRENT MEASUREMENT BY MEANS OF THE FARADAY EFFECT
Yves Pelenc, La Tronche, and Georges Bernard, Grenoble, France, assignors to Etablissements Merlin & Gerin, Societe Anonyme, Grenoble, France
Filed Apr. 11, 1966, Ser. No. 541,630
Claims priority, application France, Apr. 10, 1965, 12,789; Mar. 3, 1966, 51,961
6 Claims. (Cl. 324—96)

For measuring currents flowing through high voltage conductors, conventional magnetic transformers have hitherto been used. However, the use of these transformers at very high voltages of, say, 400 kv. or more, is very expensive, owing to the difficulties encountered in insulating these high voltages. In order to eliminate these drawbacks, it has already been proposed (in an article entitled "Current Measurement by Means of the Faraday Effect" in the Engineers Digest of December 1956, vol. 17, page 499) to use a light beam which is emitted by a source near to earth and which is polarized by a polarizer. The plane of polarization of this beam undergoes a rotation when the beam passes through a suitable transparent magneto-optically active body, such as a heavy flint, located near a high-voltage conductor in a magnetic field generated by the current to be measured. Faraday discovered that certain isotropic, transparent solid bodies (or liquids) located in a magnetic field, cause a rotation in the plane of polarization of a light beam which passes parallel to the direction of the magnetic field. The rotation is particularly great with bodies having a large refraction dispersion, such as flints, for example. The rotation of the plane of polarization is proportional to the magnetic field created by a current passing through a coil surrounding the transparent body. The beam coming from this body is redirected towards the ground, where it passes through a second polarizer or analyzer, behind which is a photoelectric cell or a photomultiplier, measuring the light intensity of the beam coming from the analyzer. A suitable arrangement of the axes of the polarizer enables the flux of the beam impinging on the photo-electric cell to be modulated by the Faraday effect. By measuring the output signal of the photo-electric cell, one obtains an indirect measure of the current flowing in the high-voltage conductor which produces the magnetic field which gives rise to the rotatory polarization. The output signal of the photo-electric cell is applied to an electronic unit comprising an amplifier and this supplies the various current measuring devices, counters, overload protection devices and short-circuit protection devices. These various devices have different response thresholds. Thus, a measuring or counting device must function correctly, for example, up to 2 or 3 $I_N$ ($I_N$ being the normal intensity), an overload protection device up to 10 to 15 $I_N$ and a short-circuit appliance up to 20 to 40 $I_N$. It may be seen that the amplifier supplying these devices must supply a considerable power since it must supply these devices with up to a value of 40 $I_N$.

It is an object of the present invention to reduce this power and thus the bulk of the amplifiers and other associated electronic devices.

Another object of the invention is to improve the guiding of the polarized beams so that the division of the beam may be obtained with a minimum bulk of the measurement device.

Still a further object of the invention is to eliminate the consequences of a failure of the light source.

These and other objects and advantages will become apparent upon reading of the following description referring to the annexed drawing and which is given by way of example only.

Figure 2:
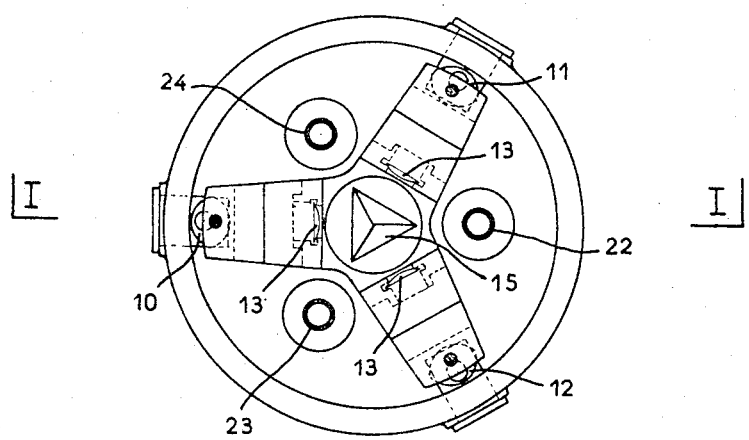
Figure 3:
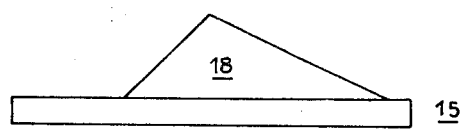
Figure 4:
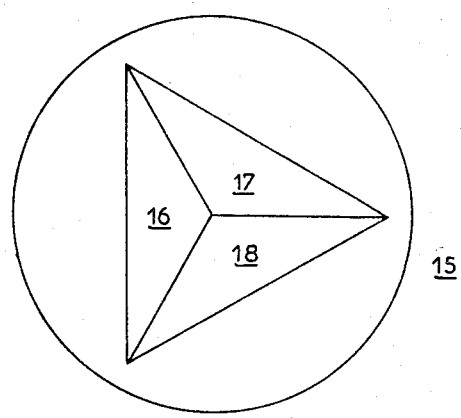

FIGURE 1 is a cross-section of a device according to the invention, taken along the line I—I in FIGURE 2,
FIGURE 2 is a cross-section along the line II—II in FIGURE 1,
FIGURE 3 shows on an enlarged scale a side elevation of the beam mixing device,
FIGURE 4 shows the device of FIGURE 3, viewed from above.

Three light sources 10, 11, 12 emit visible, infrared and ultra-violet radiation independently. The sources are located on the side where the measurement is made, near the ground. Each beam passes through an optical system 13 where they are directed horizontally at 120° relative to each other towards a mixing device 15, having three reflecting surfaces 16, 17, 18 which direct the beams emitted by the sources 10, 11, 12 towards the lower end of a light guide tube 19. The tube may be formed from any opaque or transparent internally polished substance since the light beams are directed to the inner wall of tube 19 at an angle of incidence from 85° to 90° with respect to the normal on said inner wall, so that the beams are transmitted by the tube 19 due to vitreous reflection. The beams are thoroughly mixed inside the tube 19, owing to the vitreous reflection. The mixed beams are directed towards a conductor (not shown) at high voltage, the current of which is to be measured and which may pass through the metal cap 14 of the apparatus or may be connected to this cap. A system of prisms or mirrors 20, similar to the member 15, divides the beam coming from the tube 19 into three horizontal beams, offset at 120° to each other, and each partial beam is directed by a prism 21 towards the inside of a guide tube 22, 23 and 24, respectively, arranged symmetrically around the tube 19. The following description relates only to one descending beam, the other two being identical in construction. This beam 25 passes through a polarizer 26 and a transparent body 27, placed in an axial magnetic field, created by a coil 28 carrying the current $i_1$ which flows in the high-voltage conductor (with which the coil is connected in series), or a proportional current. Under the action of the magnetic field, the plane of polarization of the beam 25 undergoes inside the transparent body 27 which has a high Verdet's constant and which may be a heavy flint, an angular rotation which is porportional to the intensity of the magnetic field, produced by the current flowing in the high-voltage conductor. This effect is known as magnetic rotatory polarization or Faraday effect.

Near to earth, this rotation of the plane of polarization is detected by a compensating method. The beam emerging from the magnetic rotating device for the plane of polarization 27 passes through a second device 29 for magnetically rotating the plane of polarization, similar to the device 27 and which is placed in the magnetic field created by a coil 30 and having a direction parallel to that of the light rays. The rotation produced in the cell 29 has the opposite direction to that produced in the cell 27 and compensates the same, so that it can be measured by a zero method. The compensating method is based on the fact that, when the two rotations are equal and opposite, the emerging beam is polarized in the same plane as the beam entering the first rotating device 27, and the secondary current $i_2$ flowing through the coil 30 is therefore proportional to the current flowing through the high-voltage conductor. The operation is similar to that of a conventional transformer. In fact, the light flux can be compared to the magnetic flux of an electro-magnetic transformer, the coil 28 furnishing the primary ampere-turns and the coil 30, the secondary ampere-turns. Any difference, however small, between the primary and secondary ampere-turns results in a slight rotation of the plane of polarization of the beam emerging from the rotating device 29 in one direction or the other relative to the fixed initial orientation. The beam emerging from the device 29 passes through an optical system 31 and is collected by a semi-reflecting light dividing plate 32 disposed at Brewster's angle. The plate 32 divides the beam into two polarized beams, illuminating, respectively two photo-electric cells 34 and 33, forming part of a balanced unit, indicated by the rectangle 35. The cells 33 and 34 are mounted in electrical opposition and supply an electric signal which is independent of the fluctuations of the light beam. This signal is amplified in an amplifier 36 which produces the current $i_2$ which supplies the coil 30 and the external load 37 formed by a measuring apparatus or relay or the like. The operation is such that the amplifier 36 acts on the secondary current $i_2$ so that the difference between the primary and secondary windings has always the tendency to become zero.

However, in order to receive always, for the photo-electric convertor, a signal which enables it to control the amplifier 36, there must, in operation, be always some slight periodic difference between the primary and secondary ampere-turns corresponding to the magnetizing windings in a conventional electro-magnetic transformer.

The optical unit is preferably located inside a chamber, the centre part of which is formed by an insulator 38.

The three descending beams 25 are used, respectively, for supplying three devices for measuring, protecting, signalling and the like, having different thresholds. By way of example, the first beam may supply an information for a measuring device for the current and an electric energy counter, the second a protecting or overload device, and the third a device protecting against short-circuits. The electronic amplifier supplying the first device can, for example, be saturated at 2 or 3 $I_N$, the amplifier supplying the second device at 10–15 $I_N$ and the amplifier supplying the third device at 20 to 40 $I_N$ so that the power supplied by the amplifiers can be substantially reduced.

We claim:

1. A device for the measurement of an electrical current flowing in a high-voltage conductor by means of a device modulating the light flux of a polarized light beam, comprising a light emitting means for emitting a light beam, optical reflecting means dividing said light beam into a plurality of separate light beams and disposed in the vicinity of said high-voltage conductor, polarizing means producing the polarization of said separate light beams, a Faraday effect device for each separate light beam including a magneto-optically active body traversed by said separate light beam and electrically conducting means producing a magnetic field in said body, said conducting means being energized by said current flowing through said high-voltage conductor to magnetically rotate the plane of polarization of said separate light beam as a function of said current, optical guide means extending substantially between said high-voltage conductor and the earth for directing said separate light beams emerging from said Faraday effect devices from the latter to the earth surface and a photoelectric converting device for each of said polarized separate light beams emerging from said guide means for elaborating said separate light beam to produce an electrical signal which is characteristic for the degree of rotation of the plane of polarization of said separate light beam in said Faraday effect device and which is a function of the value of said current.

2. A device as set forth in claim 1, wherein each of said photo-electric converting devices comprises a second Faraday effect device for compensating the rotation produced by the first named Faraday effect device and which comprises a magneto-optically active substance traversed by the separate light beam emerging from said first named Faraday effect device, and second electrically conducting means producing a magnetic field in said substance, an electronic amplifier for each of said photo-electric converting devices delivering the current for exciting said second electrically conducting means, the different amplifiers becoming saturated for different values of said current flowing in said high-voltage conductor.

3. A device as set forth in claim 1, wherein said guide means comprise tubular means having an inner wall, said separate light beams having an angle of incidence on said inner walls from 85 through 90° with respect to the normal on said wall so that said separate light beams are transmitted by said tubular means due to vitreous reflection on said inner walls.

4. A device as set forth in claim 1, wherein said light emitting means is located in the vicinity of the earth and comprises a plurality of independent light sources emitting each a light beam, optical means being provided to mix said light beams emitted by said independant sources, optical guide means extending substantially between the earth and said high-voltage conductor directing said light beam emitted by said source onto said high-voltage conductor.

5. A device as set forth in claim 1, wherein said guide means for said separate light beams are symmetrically disposed around the light beam emitted by the source and directed to said high-voltage conductor.

6. A device for the measurement of an electrical current flowing in a high-voltage conductor which is in spaced relation to the ground comprising a light emitting means located in the vicinity of the ground and emitting a light beam, means to direct said light beam to an optical reflection device located in the vicinity of said high-voltage conductor for dividing said light beam into a plurality of separate light beams, a polarizing device producing the polarization of said separate light beams, a magneto-optical device for each separate light beam disposed to be traversed by said polarized separate light beam and comprising coil means excited by said current to create a magnetic field producing a rotation of the plane of polarization of said polarized separate light beam, and a photo-electric converting device for each of said polarized separate light beams for elaborating same to produce an electrical signal which is characteristic of the degree of rotation of the plane of polarization of said polarized separate light beam.

References Cited

UNITED STATES PATENTS 3,324,393    6/1967    Casey et al. _____ 324—96
3,363,174    1/1968    Hudson et al. _____ 324—96

RUDOLPH V. ROLINEC, *Primary Examiner.*

C. F. ROBERTS, *Assistant Examiner.*

U.S. Cl. X.R.

350—151; 250—225